US012667511B2

(12) United States Patent
Seo

(10) Patent No.: US 12,667,511 B2
(45) Date of Patent: Jun. 30, 2026

(54) DEVICE FOR POSTURE CORRECTION AND KEGEL EXERCISE

(71) Applicant: Kyung Bae Seo, Gwangju-si (KR)

(72) Inventor: Kyung Bae Seo, Gwangju-si (KR)

(*) Notice: Subject to any disclaimer, the term of this patent is extended or adjusted under 35 U.S.C. 154(b) by 453 days.

(21) Appl. No.: 18/561,958

(22) PCT Filed: Jul. 13, 2022

(86) PCT No.: PCT/KR2022/010183
§ 371 (c)(1),
(2) Date: Nov. 17, 2023

(87) PCT Pub. No.: WO2023/003258
PCT Pub. Date: Jan. 26, 2023

(65) Prior Publication Data

US 2024/0225937 A1 Jul. 11, 2024

(30) Foreign Application Priority Data

Jul. 22, 2021 (KR) ........................ 10-2021-0096758
Oct. 13, 2021 (KR) ........................ 10-2021-0135925

(51) Int. Cl.
*A61H 1/02* (2006.01)
*A43B 13/18* (2006.01)
*A43B 21/32* (2006.01)

(52) U.S. Cl.
CPC ......... *A61H 1/0244* (2013.01); *A43B 13/186* (2013.01); *A43B 21/32* (2013.01); *A61H 2001/0203* (2013.01); *A61H 2201/164* (2013.01); *A61H 2201/165* (2013.01); *A61H 2201/1671* (2013.01); *A61H 2203/0406* (2013.01)

(58) Field of Classification Search
CPC .......... A61H 1/0244; A61H 2001/0203; A61H 2201/164; A61H 2201/165; A61H 2201/1671; A61H 2203/0406; A43B 13/186; A43B 21/32; A43B 13/182; A43B 13/14; A43B 21/30
See application file for complete search history.

(56) References Cited

U.S. PATENT DOCUMENTS 11,452,330 B1 * 9/2022 Nasibyan ............... A61H 15/00
2011/0138650 A1 * 6/2011 Gershon .............. A43B 13/182
36/35 R

* cited by examiner

*Primary Examiner* — Tarla R Patel
(74) *Attorney, Agent, or Firm* — Sughrue Mion, PLLC

(57) ABSTRACT

Proposed is a technology which relates to a device for posture correction and Kegel exercises and is employed in a pair of foot-protecting means provided on the left and right feet to enable posture correction and Kegel exercises during walking without significant expense of time and cost. The device includes an upper plate, a lower plate, and a spiral compression part provided between the upper plate and the lower plate, wherein the upper plate rotates relative to the lower plate during vertical compression of the spiral compression part, the spiral compression part is coupled to the foot-protecting means of each of the left and right sides, and rotation directions of the spiral compression parts of the left and right sides are opposite to each other.

8 Claims, 5 Drawing Sheets

DEVICE FOR POSTURE CORRECTION AND KEGEL EXERCISE

CROSS REFERENCE TO RELATED APPLICATIONS

This application is a National Stage of International Application No. PCT/KR2022/010183 filed Jul. 13, 2022, claiming priority based on Korean Patent Application No. 10-2021-0096758 filed Jul. 22, 2021 and Korean Patent Application No. 10-2021-0135925 filed Oct. 13, 2021.

TECHNICAL FIELD

The present disclosure relates to a technology that allows posture correction and Kegel exercises while walking.

BACKGROUND ART

Kegel exercises, developed in 1948 by American gynecologist Arnold Kegel, M. D., are exercises that can strengthen the pelvic floor muscles and have been found to be effective in treating urinary and fecal incontinence and improving sexual performance. In addition, the external rotator muscles of the hip joint are known to play an important role in posture correction.

Walking is a good exercise that can be done easily and safely. During the process of walking, the extensors and flexors of the hip, knee, and ankle joints are mainly used. However, since the hip external rotators and pelvic floor muscles are rarely used during walking, there appears to be no known technique for strengthening the hip external rotators and pelvic floor muscles by walking.

DISCLOSURE

Technical Problem

Walking is a cost-effective exercise and is a good way to gain strength training effects for the extensors and flexors of the hip, knee, and ankle joints, which are the muscles mainly used while walking. However, hip external rotators and pelvic floor muscles are rarely used during walking, and thus posture correction and Kegel exercise effects cannot be expected during the walking process.

Technical Solution

In order to achieve the above mentioned objective, there is provided a device for posture correction and Kegel exercises, the device being applied to a foot-protecting means that is used while walking and is provided as a pair for left and right sides, the device, including: an upper plate; a lower plate; and a spiral compression part provided between the upper plate and the lower plate, wherein the upper plate may rotate relative to the lower plate during vertical compression of the spiral compression part, the spiral compression part may be coupled to the foot-protecting means of each of the left and right sides, and rotation directions of the spiral compression parts of the left and right sides may be opposite to each other.

Advantageous Effects

According to the present disclosure, the effect of strengthening the muscles required for posture correction and Kegel exercises can be expected without the burden of additional time and cost during the walking process.

BEST MODE

Hereinafter, preferred embodiments of the present disclosure will be described in detail with reference to the attached drawings.

Main movements that occur in the lower extremity of the human body during the walking process are flexion and extension of the hip joint, flexion and extension of the knee joint, and flexion and extension of the ankle joint, and the muscles used at this time are the flexor muscles and extensor muscles of the hip joint, knee joint, and ankle joint, which are muscles that run in an up-down direction, and the external rotator muscles of the hip joint and the pelvic floor muscles, which are muscles that run in a left-right direction, are rarely used.

The present applicant, a rehabilitation medicine doctor, discovered that, from the perspective of functional anatomy, only flexion and extension are possible at the knee joint and ankle joint, and rotation is not possible, and that the rotational motion of a foot causes the rotational motion of the hip joint, bypassing the ankle and knee joints. Based on this, the present applicant has disclosed a number of technologies (KR 100834470, etc.) to strengthen the external rotator muscles of the hip joint using the external rotation of a foot. In the process of improving the strength of the external rotator muscles of the hip joint using the above technologies, the present applicant presented clinical results on Apr. 17, 2016, at the inaugural conference of the Korean Association for Women's Sexual Health (Sejong University Gwanggaeto Hall Convention Hall). The clinical results show that the effect of Kegel exercises is maximized by increasing the strength of the piriformis muscle and obturator internus muscle, which are external rotator muscles of the hip joint and also the pelvic floor muscles that are the target muscles of Kegel exercises.

Based on the principles of the above clinical results, the present applicant has previously applied for domestic patent application 10-2021-0096758 (ROTATIONAL MOTION DEVICE FOR SHOES FOR KEGEL EXERCISES), a technology that causes a rotational movement in the pedestrian's feet while walking and uses this rotational movement to achieve the effects of strengthening the external rotator muscles of the hip joint and doing Kegel exercises, and claims priority to the earlier application and intends to apply for the present disclosure, which is an improved invention.

Figure 1:
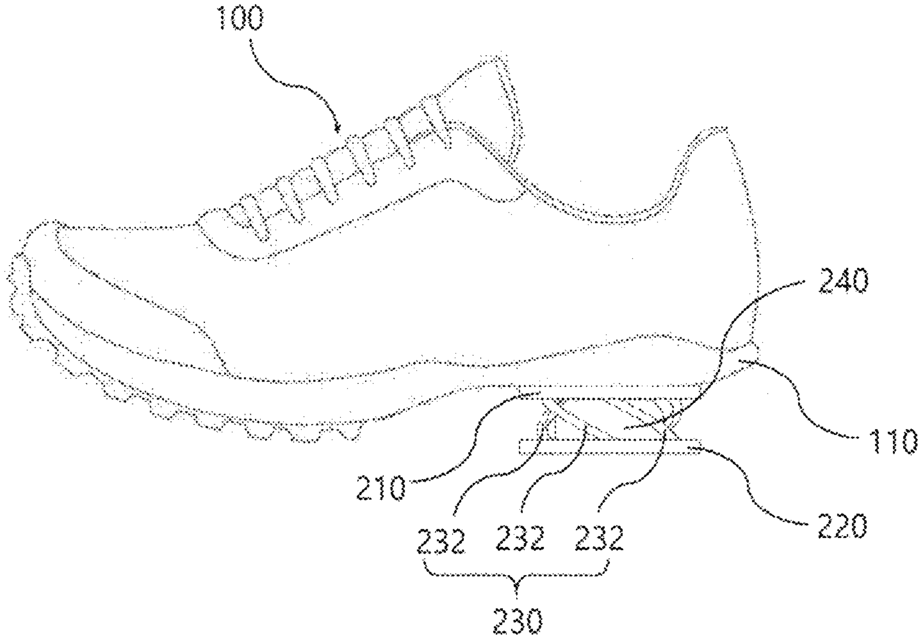
FIG. 1 is a schematic diagram of an embodiment in which a device for posture correction and Kegel exercises of the present disclosure is combined with the sole of a shoe.
Figure 2:
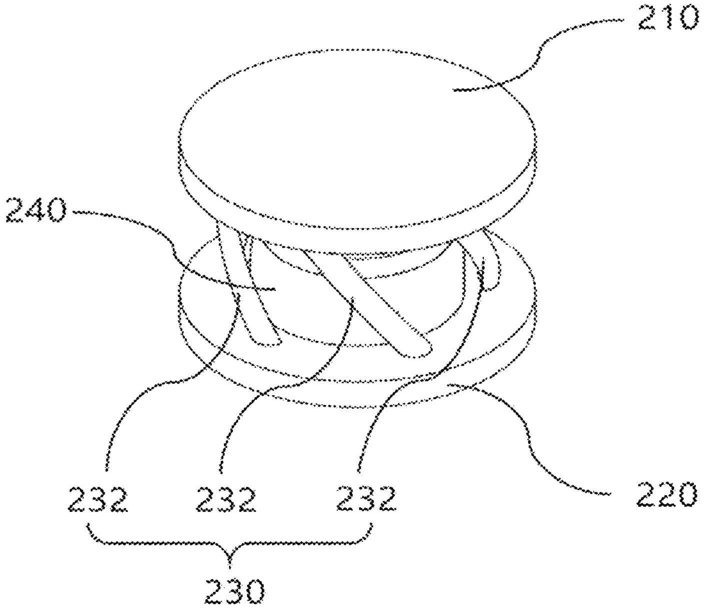
FIG. 2 is a perspective view of a first embodiment of the device for posture correction and Kegel exercises of the present disclosure.
Figure 3:
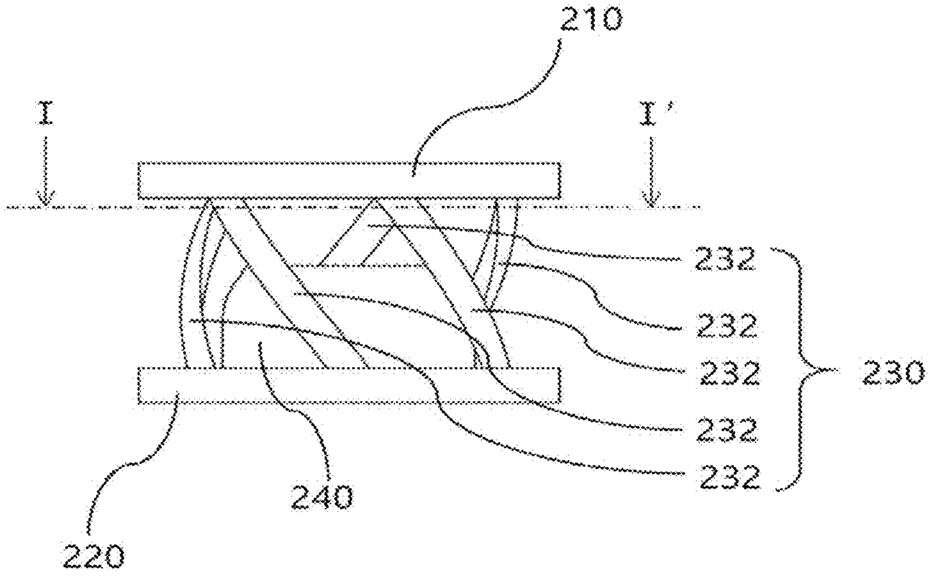
FIG. 3 is a side view of the first embodiment of the device for posture correction and Kegel exercises of the present disclosure.
Figure 4:
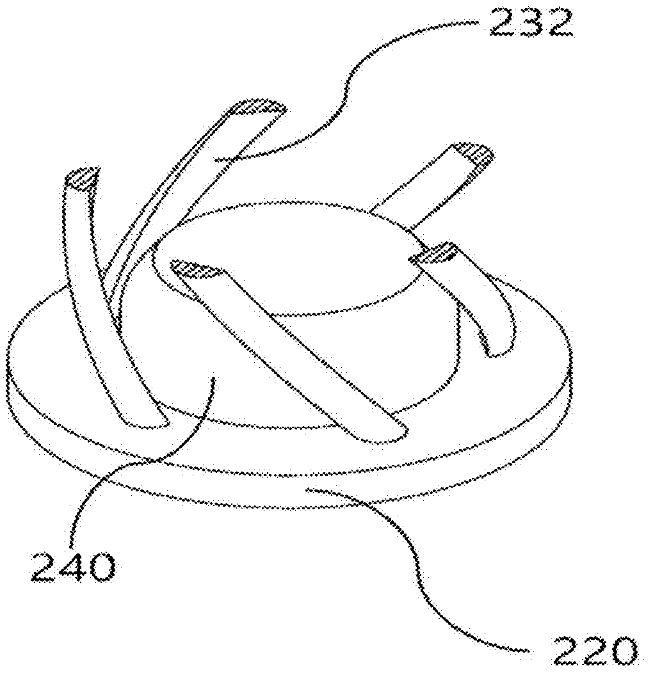
FIG. 4 is a perspective view after cutting along line I-I' in FIG. 3.
Figure 5:
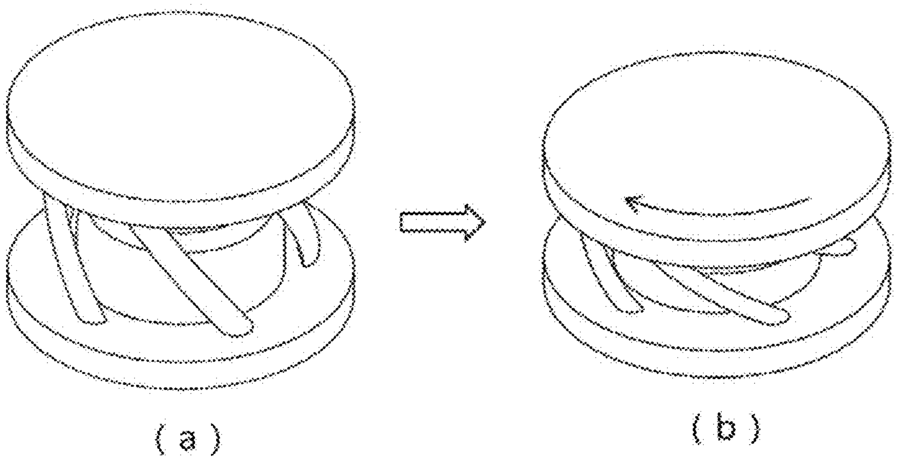
FIG. 5 is a diagram showing the use of a spiral compression part using the perspective view of the first embodiment of the device for posture correction and Kegel exercises of the present disclosure.

FIG. 1 is a schematic diagram of an embodiment in which a device for posture correction and Kegel exercises of the present disclosure is combined with the sole of a shoe; FIG. 2 is a perspective view of a first embodiment of the device for posture correction and Kegel exercises of the present disclosure; FIG. 3 is a side view of the first embodiment of the device for posture correction and Kegel exercises of the present disclosure; FIG. 4 is a perspective view after cutting along line I-I' in FIG. 3; and FIG. 5 is a diagram showing the use of a spiral compression part using the perspective view of the first embodiment of the device for posture correction and Kegel exercises of the present disclosure.

Figure 6:
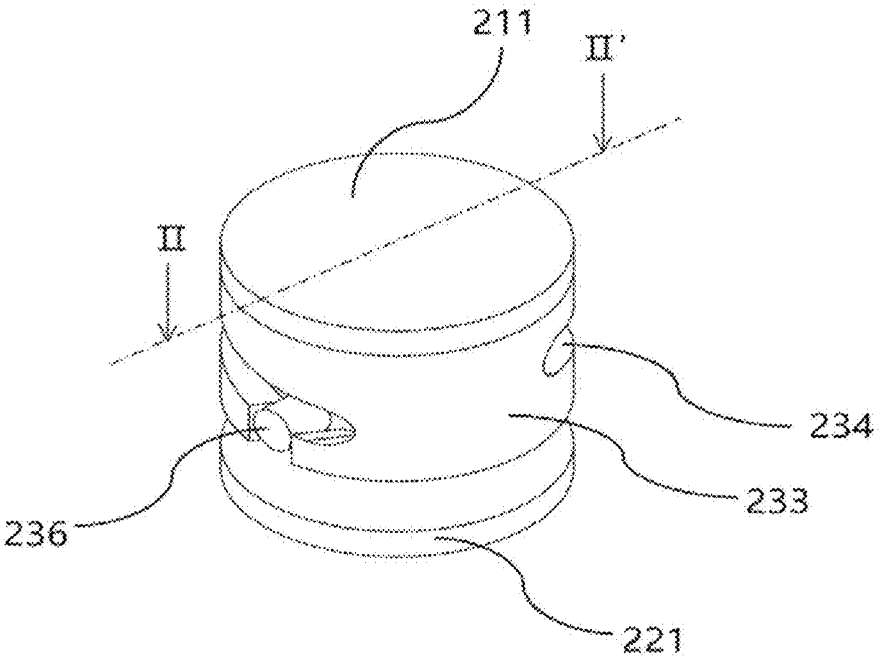
FIG. 6 is a perspective view of a second embodiment of the device for posture correction and Kegel exercises of the present disclosure.
Figure 7:
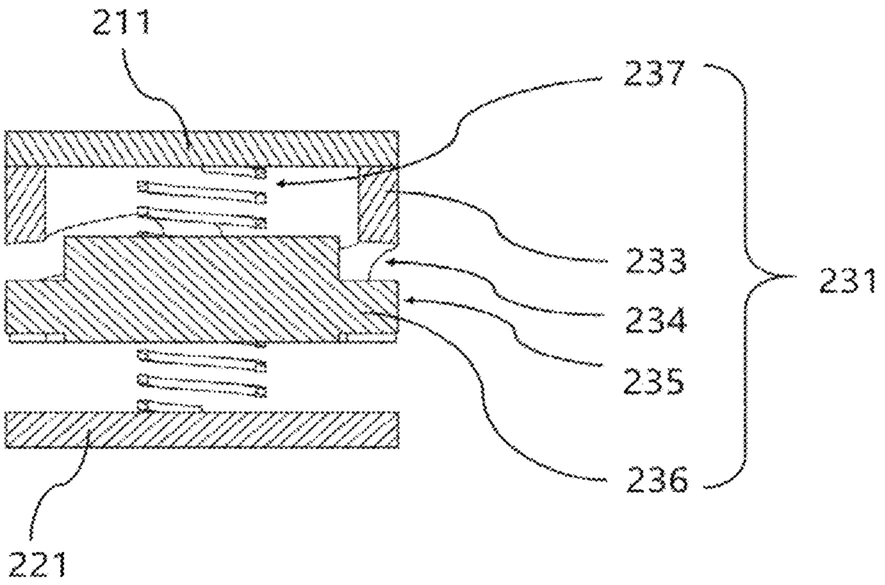
FIG. 7 is a cross-sectional view taken along line II-II' in FIG. 6.

FIG. 6 is a perspective view of a second embodiment of the device for posture correction and Kegel exercises of the present disclosure; and FIG. 7 is a cross-sectional view taken along line II-II' in FIG. 6.

Figure 8:
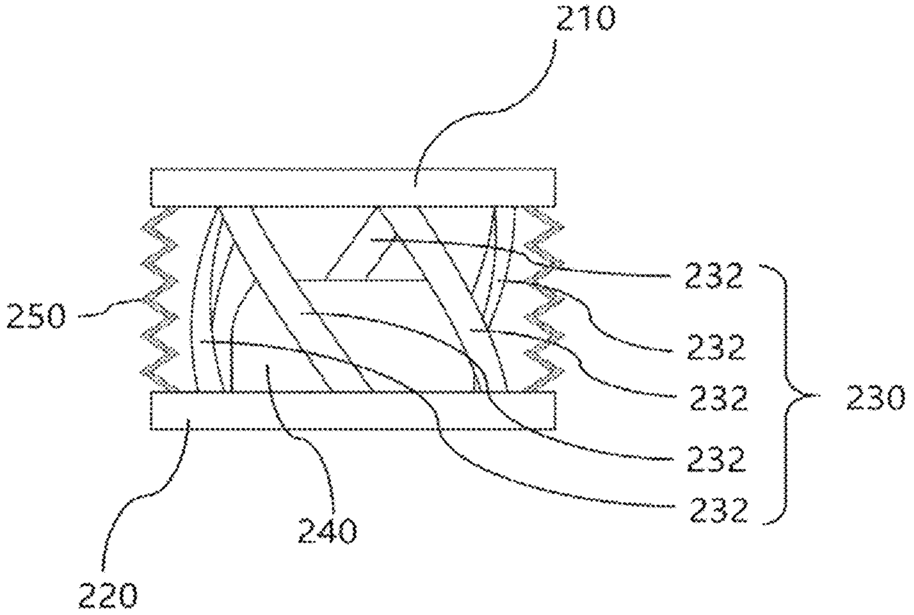
FIG. 8 is the side view of the first embodiment in FIG. 3 with a partition wall added.
Figure 9:
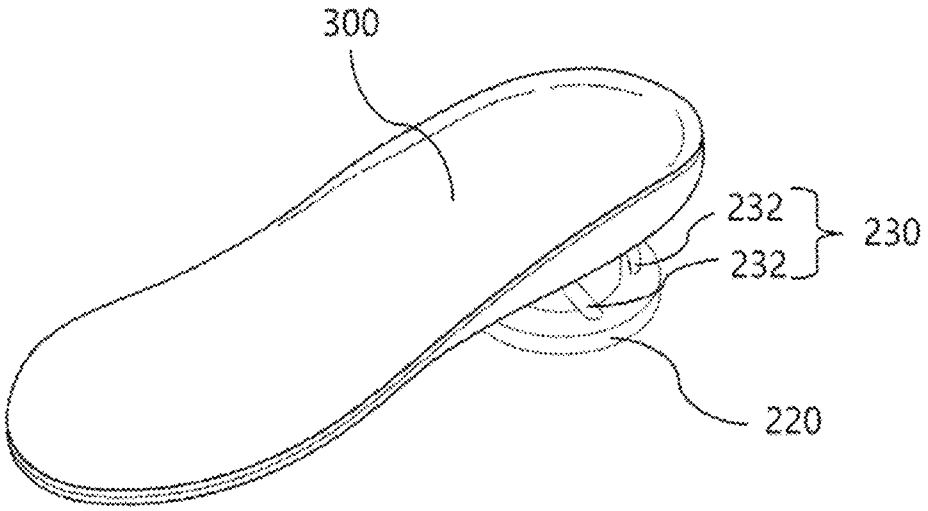
FIG. 9 is a schematic diagram of the first embodiment of the device for posture correction and Kegel exercises of the present disclosure combined on the lower part of the insole.
Figure 10:
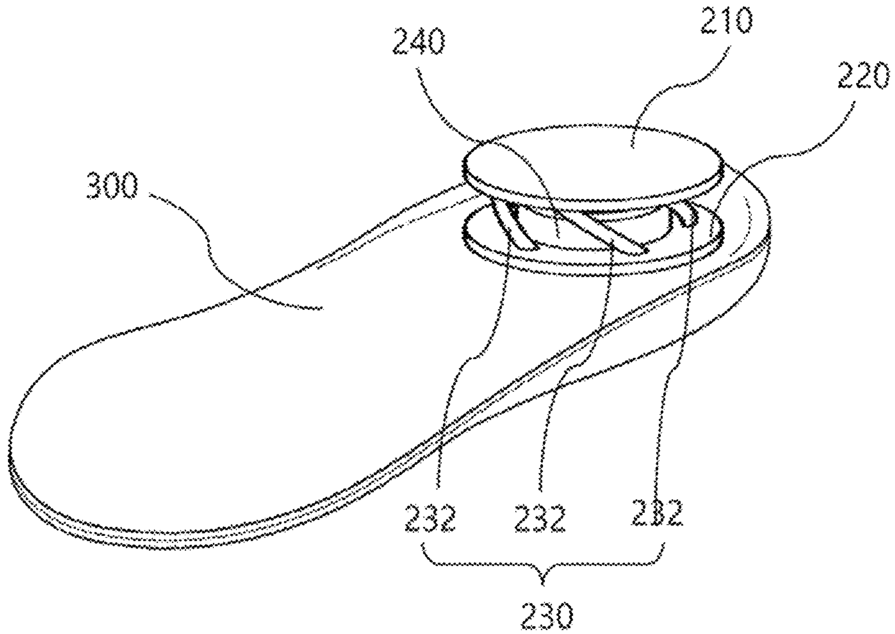
FIG. 10 is a schematic diagram of the first embodiment of the device for posture correction and Kegel exercises of the present disclosure combined on the upper part of the insole.

FIG. 8 is the side view of the first embodiment in FIG. 3 with a partition wall added; FIG. 9 is a schematic diagram of the first embodiment of the device for posture correction and Kegel exercises of the present disclosure combined on the lower part of the insole; and FIG. 10 is a schematic diagram of the first embodiment of the device for posture correction and Kegel exercises of the present disclosure combined on the upper part of the insole.

As shown in FIGS. 1 to 5, by coupling a spiral compression part 230 in which a plurality of spiral members 232 made of elastic material connect an upper plate 210 and a lower plate 220 to a sole 110 of a shoe 100, when the lower plate 220 of the pedestrian's shoe 100 contacts the ground and the spiral compression part 230 is compressed by the pedestrian's weight, a spiral movement occurs in the spiral compression part 230.

The direction of rotation is determined depending on the direction of the spiral of the spiral member 232. For example, when the spiral member 232 is formed to spirally rotate clockwise with respect to the lower plate 220, the upper plate 210 rotates clockwise with respect to the lower plate 220.

Conversely, if the spiral member 232 is formed to rotate counterclockwise with respect to the lower plate 220, the upper plate 210 will rotate counterclockwise with respect to the lower plate 220.

Although not shown in the drawings, the upper plate 210 and the sole 110 of the shoe 100 may be forcibly coupled by a groove and a protrusion that are respectively formed to be coupled to each other, or may be coupled by a strong adhesive or a bolt-and-nut assembling method. Alternatively, the upper plate 210 and the sole 110 may be formed as one piece.

The spiral movement of the spiral compression part 230, induced by the pedestrian's weight compressing the spiral compression part 230 as the lower plate 220 coupled to the sole 110 of the shoe 100 on each of the left and right sides of the pedestrian touches the ground during the walking process, transmits rotating force to both left and right feet through rotation of the upper plate 210. This force causes the rotational movement of the right hip joint, bypassing the ankle and knee joints, so that movement of the pelvic floor muscles, including the external rotator muscles of the hip joint, piriformis, and obturator internus on either side of the body running horizontally, is achieved, enabling posture correction exercises and Kegel exercises through continuous walking.

By making the spiral rotation directions of the spiral members 232 of the shoe 100 on each of the left and right sides opposite to each other, internal rotation or external rotation may be performed simultaneously in each shoe 100. The intensity of strength training may be adjusted by adjusting the magnitude of the rotational force generated in the spiral compression part 230 by increasing or decreasing the elasticity, length, and cross-section of the spiral member 232. It is possible to perform the strength exercises the same or differently for the left and right shoes.

One spiral compression part 230 may be coupled to the shoe sole 110, or a plurality of spiral compression parts 230 may be coupled to the sole 110 of the shoe.

As shown in FIGS. 1 to 4, by providing a guide part 240 located inside the spiral member 232, coupled to the upper side of the lower plate 220, and protruding in the upper direction of the lower plate 220, it is possible to prevent the compression direction from being deformed due to repeated compression of the spiral members 232. Although not shown in the drawings, it is possible for the guide part 240 to protrude downward from the upper plate 210.

FIG. 6 is a perspective view of a second embodiment of the device for posture correction and Kegel exercises of the present disclosure; and FIG. 7 is a cross-sectional view taken along line II-II' in FIG. 6.

As shown in FIGS. 6 and 7, a spiral compression part 231 of the second embodiment is provided with: a hollow part 233 in which a spiral groove 234 is formed on the side wall of the hollow part 233; and a penetration part 235 in which a protruding jaw 236 that moves spirally along the spiral groove 234 is formed and in which an elastic member 237 is coupled to the lower and upper surfaces of the penetration part 235. By ensuring that the hollow part 233 and the penetration part 235 are respectively coupled to either the upper plate 211 or the lower plate 221, rotational force may be generated between the upper plate 211 and the lower plate 221 by compression of the spiral compression part 231. It is also possible to form the elastic member 237 on only one of the upper and lower surfaces of the penetration part 235.

FIG. 8 is the side view of the first embodiment in FIG. 3 with a partition wall added. By providing a partition wall 250 formed in the form of a corrugated plate on the outside of the spiral compression part 230 to be coupled to at least one of the upper plate 210 and the lower plate 220, contamination from sewage on the ground may be avoided while walking. The partition wall 250 may be made using a material with a smaller elastic modulus than the spiral compression part 230, so as not to interfere with the compression of the spiral compression part 230.

As shown in FIGS. 1 to 8, the device for posture correction and Kegel exercises of the present disclosure may also be applied to various foot-protecting means such as slippers, socks, etc., in addition to being applied to the sole or insole of a shoe.

FIG. 9 is a schematic diagram of the first embodiment of the device for posture correction and Kegel exercises of the present disclosure combined on the lower part of the insole; and FIG. 10 is a schematic diagram of the first embodiment of the device for posture correction and Kegel exercises of the present disclosure combined on the upper part of the insole.

By allowing the pedestrian's weight to be transferred to the spiral compression part 230 coupled to the insole placed in the shoe 100 while walking, the spiral movement occurring in the spiral compression part 230 transmits rotating force to both left and right feet through rotation of the upper plate 210. This force causes rotational movement of the right hip joint, bypassing the ankle and knee joints, so that movement of the pelvic floor muscles, including the external rotator muscles of the hip joint, piriformis, and obturator internus on either side of the body running horizontally, is achieved, enabling posture correction exercises and Kegel exercises through continuous walking.

Preferred embodiments of the present disclosure have been described above, and various modifications may be made without departing from the scope of the present disclosure. Therefore, the scope of rights of the present disclosure is not limited to the above embodiments, and the scope of the patent claims of the present disclosure and all techniques equivalent thereto should be considered to be included in the scope of rights of the present disclosure.

The invention claimed is:

1. A device for posture correction and Kegel exercises, the device being applied to a foot-protecting means that is used while walking and is provided as a pair for left and right sides, the device comprising:

an upper plate;

a lower plate; and a spiral compression part provided between the upper plate and the lower plate, wherein the upper plate rotates relative to the lower plate during vertical compression of the spiral compression part, the spiral compression part is coupled to the foot-protecting means of each of the left and right sides, and rotation directions of the spiral compression parts of the left and right sides are opposite to each other, wherein the upper plate is configured to protrude more upwardly than the foot-protecting means, or the lower plate is configured to protrude more downwardly than a bottom surface of the foot-protecting means.

2. The device of claim 1, wherein the spiral compression part is made of an elastic material and is provided with a plurality of spiral members connecting the upper plate and the lower plate.

3. The device of claim 2, further comprising:

a guide part provided on the inside of each of the spiral members, and coupled to the upper plate and configured to protrude downward from the upper plate, or coupled to the lower plate and configured to protrude upward from the lower plate.

4. The device of claim 1, wherein the spiral compression part comprises:

a hollow part in which a spiral groove is formed on a side wall thereof; and a penetration part in which a protruding jaw that moves spirally along the spiral groove is formed and in which an elastic member is coupled to at least one of lower and upper surfaces thereof, wherein the hollow part and the penetration part are respectively coupled to either the upper plate or the lower plate.

5. The device of claim 1, wherein magnitudes of rotational forces generated from the spiral compression parts coupled to the foot-protecting means are different for the left and right sides.

6. The device of claim 1, further comprising:

a partition wall coupled to at least one of the upper plate and the lower plate, provided on the outside of the spiral compression part, and having a smaller elastic modulus than the spiral compression part.

7. The device of claim 1, wherein the upper plate or the lower plate is formed integrally with the foot-protecting means.

8. The device of claim 1, wherein the foot-protecting means is any one of a shoe, an insole, a slipper, and a sock.

* * * * *